(12) United States Patent
Bristow (10) Patent No.: US 8,328,541 B2
(45) Date of Patent: Dec. 11, 2012

(54) DISPLACEMENT CONVERSION MECHANISM AND ACTUATOR

(75) Inventor: Gareth Philip Bristow, Wimborne (GB)

(73) Assignee: Rodia Technologies Limited, Wimbourne (GB)

( * ) Notice: Subject to any disclaimer, the term of this patent is extended or adjusted under 35 U.S.C. 154(b) by 386 days.

(21) Appl. No.: 12/742,653

(22) PCT Filed: Nov. 14, 2007

(86) PCT No.: PCT/GB2007/004338
§ 371 (c)(1), (2), (4) Date: May 12, 2010

(87) PCT Pub. No.: WO2008/059235
PCT Pub. Date: May 22, 2008

(65) Prior Publication Data
US 2010/0254831 A1    Oct. 7, 2010

(51) Int. Cl.
*A61M 1/00*    (2006.01)
(52) U.S. Cl. .......................................... 417/437; 74/567
(58) Field of Classification Search ............... 417/437; 92/31, 136; 74/25, 567, 568, 569
See application file for complete search history.

(56) References Cited

U.S. PATENT DOCUMENTS

| | | | |
|---|---|---|---|
| 205,868 A * | 7/1878 | Huston et al. | 418/68 |
| 2,585,569 A | 2/1952 | Meneely et al. | |
| 2,953,166 A * | 9/1960 | Carlson, Jr. | 92/31 |
| 2,966,064 A | 12/1960 | Courtney et al. | |
| 3,403,668 A | 10/1968 | Schottler | |
| 3,443,446 A | 5/1969 | Buergel | |
| 3,830,484 A | 8/1974 | Bright et al. | |
| 3,838,609 A * | 10/1974 | Denkowski et al. | 74/625 |
| 4,111,060 A | 9/1978 | Nerini | |
| 4,278,152 A | 7/1981 | Tosi | |
| 4,433,879 A | 2/1984 | Morris | |
| 5,036,809 A * | 8/1991 | Goodman | 123/241 |
| 6,343,575 B1 * | 2/2002 | Deckard | 123/43 R |
| 2005/0050973 A1 | 3/2005 | Olschewski et al. | |
| 2007/0221011 A1* | 9/2007 | Wang et al. | 74/567 |

FOREIGN PATENT DOCUMENTS

| | | |
|---|---|---|
| BE | 385547 A | 2/1932 |
| DE | 2902025 A | 7/1980 |
| EP | 0432786 A1 | 6/1991 |
| FR | 370319 A | 2/1907 |
| FR | 733873 A | 10/1932 |
| GB | 2331568 A | 5/1999 |
| JP | 06272746 A | 9/1994 |
| JP | 2004211725 A | 7/2004 |

* cited by examiner

*Primary Examiner* — Devon Kramer
*Assistant Examiner* — Christopher Maxey (57) ABSTRACT

A mechanism converts rotational displacement to linear displacement with ramped driver discoidal elements and ramped driven discoidal elements on a common central axis. The ramped surfaces of the two elements are complementarily shaped and opposed so that, when in contact and completely interengaged, they form an assembly of minimum length. The driver elements are rotated by an external force. The driven elements are allowed to translate along the common axis while being prevented from rotating about the common axis, whereby a rotational displacement of the driver elements by an externally applied force causes the elements to separate by camming action of the interengaged ramp surfaces to produce a linear displacement of the driven elements. A spring is coupled to the driven elements so as to restore the assembly to its minimum length in the absence of the externally applied force.

20 Claims, 10 Drawing Sheets

DISPLACEMENT CONVERSION MECHANISM AND ACTUATOR

TECHNICAL FIELD OF THE INVENTION

The present invention relates to displacement conversion mechanisms and, in particular, to the conversion of rotary to translational displacement and to actuators employing such mechanisms.

BACKGROUND OF THE INVENTION

Actuators for producing a mechanical displacement of a member to be driven are employed throughout industry in a wide variety of applications. These include machinery control mechanisms, including valves and linkages, robotics, prosthetics, camera optics, pumps, brakes and power tools to name but a few. The displacement required may be rotary, linear or other translational and of short or long stroke. It may be unidirectional, with a separate return mechanism such as a spring or bidirectional, including reciprocation. The choice of actuator for a particular application often depends on the environment in which it is to be used.

Many forms of actuator for producing linear or other translational displacement of a driven object are known in the prior art. These include straightforward pneumatic and hydraulic piston arrangements and more recently developed devices known as "air muscles" in which inflation of a bladder causes contraction of an outer metal sheath in a manner similar to living muscle contraction. Other forms of linear actuator are electromagnetic, such as the solenoid and the voice coil motor. Such devices have limited extension capabilities.

Electric motors, such as stepper or servo motors, are also convenient drivers for actuator devices but to produce linear displacements their rotary output must be transformed into a linear motion by a suitable conversion mechanism. Many such mechanisms have been employed for this purpose such as the rack and pinion mechanism and the lead screw. In the latter case, a short threaded nut is translated along a long threaded shaft rotated by the motor and is coupled to a member to be driven, such as a print carriage. By appropriate choice of thread pitch or use of additional gearing, the mechanical advantage of this type of mechanism can be increased to produce relatively large extensions for small rotations.

Cam shafts and followers, biased by a return spring, are also widely used, especially in conventional engines, for producing reciprocating linear motion and similar cam follower and spring arrangements are also used in power tools to produce a reciprocating action from a conventional electric motor drive shaft.

There is still scope however for a simple rotary to translational motion conversion mechanism, capable of producing large extensions for a limited angle of rotation and robust enough to be tolerant of hostile environments. The present invention offers such a mechanism.

Also known in the prior art are adjustable shims or spacer arrangements for producing a desired static linear displacement by relative rotation of complementarily shaped discoidal wedges or cams. Such arrangements are described in U.S. Pat. No. 4,433,879 (J. C. Morris) for an "Adjustable Extension-Cam Shim" and in GB published patent application 2331568 (A. Szmidla) for "Wedges and arrangements thereof".

DISCLOSURE OF THE INVENTION

Accordingly, the invention provides a rotational to linear displacement conversion mechanism comprising: an assembly including a plurality of driver discoidal elements and a plurality of driven discoidal elements mounted alternately on a common central axis to form an interleaved stack, each discoidal element having a ramped surface, the ramped surfaces of adjacent elements being complementarily shaped and opposed so that, when in contact and completely interengaged, they form a stack of minimum length; coupling means for coupling the driver discoidal elements for rotation together about the axis by an externally applied force while permitting them to translate along the axis; said driven elements being mounted in such a way as to permit translation along the common axis while preventing rotation of the driven elements about the common axis, whereby a rotational displacement of the driver elements by such an externally applied force causes the elements to separate by camming action of their interengaged ramp surfaces so as to produce an extension of the stack corresponding to the cumulative separations of the driver and driven elements; and resilient bias means for restoring the assembly to its minimum length in the absence of the externally applied force.

Such devices are very compact and rugged and, in contrast to the prior art devices of U.S. Pat. No. 4,433,879 and GB 2331568 which are essentially static and have no guide system or return mechanism, are suitable for many dynamic precision applications such as positioning actuators or measured stroke fluid delivery devices, such as syringes for medication or for fuel dispensers. Reciprocation may also be produced by continuous rotation and used in pump applications.

Using a stack of elements allows for a much greater, cumulative extension for a given rotation and is made possible by the coupling of the driver elements for rotation while allowing their linear separation.

This is preferably implemented by providing at least the driven discoidal elements intermediate the ends of the stack with axially aligned bores, each driver element having a projection extending axially from one face which extends through the bore of its adjacent driven disc and locates in a recess in a proximate driver element in keyed, slideable engagement therewith so that rotational drive force can be transmitted between driver elements while allowing relative sliding motion in an axial direction.

Preferably each said driver element recess is part of a bore through the driver element and said projection is preferably part of at least one rib formed on the inner surface of the bore of its corresponding driver element, which rib projects outwardly from its driver element discoidal portion and engages at least one complementarily oriented rib portion in the bore of the proximate driver element to provide said keyed slideable engagement.

Although other arrangements would be possible, one preferred arrangement is for the bore in each intermediate driver element to be provided with two diametrically opposite ribs each extending over a 90 degree arc of the bore, said ribs being keyed into engagement with a similar pair of ribs in a proximate driver element oriented at 90 degrees to the first mentioned pair of ribs.

The preferred way of preventing rotation of the driven elements is to provide them each with a plurality of peripheral lugs, the mechanism further including grooved guide means surrounding the stack in which the lugs locate to prevent rotation.

Preferably, a driver element is located at one end of the stack and has an outer surface adapted to be coupled to an external drive and an inner ramped surface and a driven element is located at the opposite end of the stack and has an outer surface adapted to deliver a translational load force and an inner ramped surface, intermediate driver and driven elements having ramped surfaces on both sides. Preferably the end driver element is fixedly mounted on an outwardly extending axial shaft, threaded externally for coupling to the external drive.

In such an arrangement, it is preferred that the mechanism includes a housing assembly for the stack, comprising a cylindrical cover to one end of which the terminal driven element is fixed, the other end of the cover terminating in a slotted flange. The housing assembly further comprises a fixed cage structure surrounding the cylindrical cover and being formed with a plurality of guide legs extending in the axial direction and passing through the slots in the flange of the cylindrical cover to constrain it to linear movement. Additionally, the cylindrical cover is provided with external grooves and the guide legs are provided with internal grooves in both of which said peripheral lugs locate, in operation, to restrain the driven discs against rotation while permitting translation.

Another preferred feature is that the resilient bias means is a coil spring trapped between the flange of the cylindrical cover and an end of the cage.

Another preferred feature is that the driver and driven elements each have a plurality of ramps per ramped surface, distributed circumferentially at evenly spaced positions. This enables an even greater ratio of displacement to angle of rotation than would be the case with a single 360° ramp.

For a single stroke application, it is preferred that the camming ramp surfaces are planar, rising at a relatively shallow angle to the plane of the discoidal elements and alternating with relatively steep return surfaces.

For a continuously rotated application, both the rising and falling surfaces of the ramps could be at the same angle or the ramped surfaces are smoothly undulating in form without discontinuity at the peaks. The latter arrangement is the more compact, in its unextended state.

For single stroke applications, the mechanism may include a stop for preventing rotation of the driver element beyond the arc defined by the ramp surface.

When provided with a drive mechanism for rotatably driving such driver elements, the displacement conversion mechanism becomes an actuator. The drive mechanism may be a motor or a manually operated crank. A continuously rotated driver element will produce a reciprocating linear output.

Such an output from a displacement mechanism including a rotatable crank for rotatably driving the driver elements is eminently suitable for a hand pump application which would require a sealed casing for enclosing the mechanism and forming a pump chamber containing a one way inlet means for permitting fluid to be drawn into the pump chamber as the mechanism contracts and an outlet for enabling fluid to be expelled from the pump chamber as the mechanism extends one way, as the crank is rotated continuously.

BRIEF DESCRIPTION OF THE DRAWINGS

The invention will now be further described, by way of example only, with reference to preferred embodiments thereof as illustrated in the accompanying drawings, in which.

DETAILED DESCRIPTION OF THE INVENTION

Figure 1:
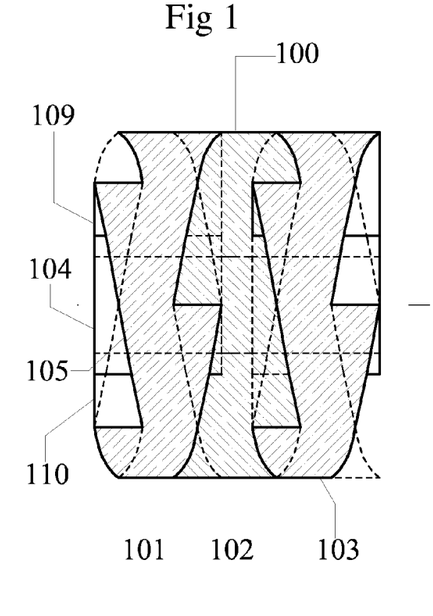
FIG. 1 is a side elevation of an unextended stepped disc stack illustrating the principles underlying a displacement mechanism according to the invention.
Figure 2:
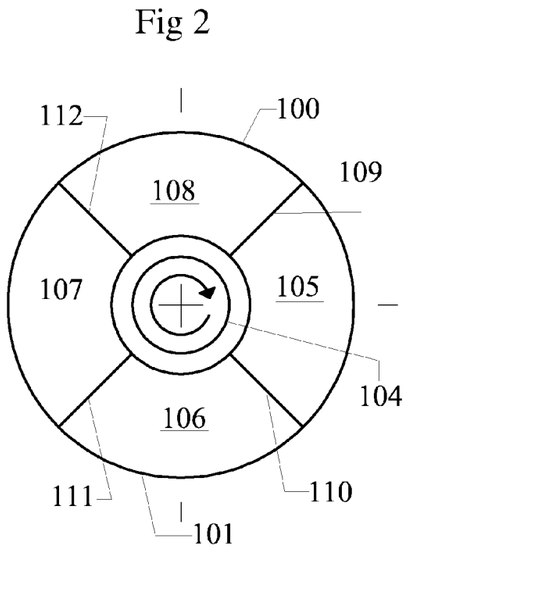
FIG. 2 is an end elevation of one of the discs making up the stack of FIG. 1.

In FIGS. 1 to 14, the principles of operation of one form of displacement mechanism according to the invention will now be described. This mechanism involves a stacked assembly 100 of discoidal elements, also referred to as discs, of which three, numbered 101, 102 and 103, are shown in FIG. 1. The discs are not planar but are relieved to provide four planar ramp surfaces in four sectors on opposite sides, surrounding a central bore 104, those on one side being offset by 45° from those on the other side. Four of the ramped surfaces 105-108 are seen in the end elevation of the mechanism from the left hand side, looking at disc 101, as shown in FIG. 2. The visible edges of the ramped surfaces on the assembly 100 are drawn as continuous lines in FIGS. 1 to 4 whereas the invisible edges are dashed. The edges of the discs nearest the viewer are hatched for illustrative purposes only. Each ramped surface terminates in a steep return step, such as steps 109-112 in the case of the outer face of disc 101.

Figure 3:
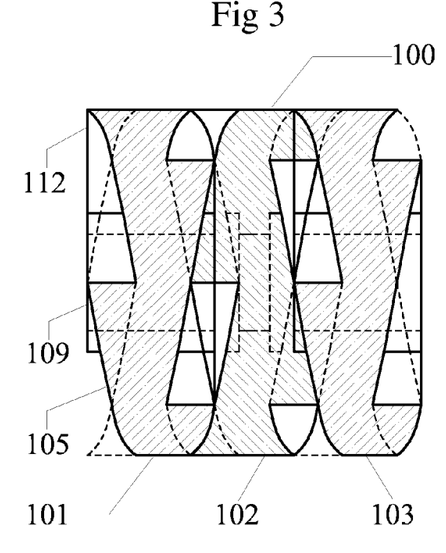
FIG. 3 is a side elevation of the disc stack of FIG. 1 in a partially extended state.
Figure 4:
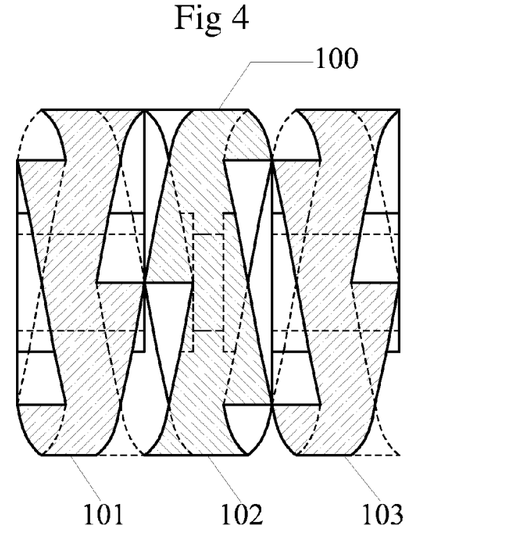
FIG. 4 is a side elevation of the disc stack of FIG. 1 in a fully extended state.

In FIG. 1, the assembly 100 is in its unextended state and the ramped surfaces of the three discs are snugly interengaged in complementary fashion to take up the minimum space. If discs 101 and 103 are rotated in the direction of the arrow shown in FIG. 2, while the intermediate disc 102 is restrained against rotation, the camming action of the opposed ramped surfaces forces the discs to separate, as shown in FIG. 3. The maximum displacement is achieved, as shown in FIG. 4, after a rotation of 45°, when the stepped return surfaces at the end of the opposed ramp surfaces coincide. The maximum displacement is equal to double the height of the ramps multiplied by the number of disc-to-disc interfaces and the rotation needed to achieve it depends on the number of sectors per disc. So in this example, four sectors require a rotation of 45° to achieve maximum displacement.

How this principle is applied to a practical mechanism is illustrated in FIGS. 5 to 9. In FIGS. 1 to 4, no distinction was made between the discs, except for the implied restraint against rotation of disc 102. In a practical application, it is necessary to design driver and driven discs differently. In fact, in the assembly 120 of FIG. 5, there are several types of each disc. These consist of an input driver disc 121, identical intermediate driven discs 122 alternating with identical driver discs 123 and 124, and terminating in an output driven disc 125. The driver discs 123 and 124 are structurally identical but discs 123 are in a first orientation while discs 124 are oriented at 90° to discs 123. All the discs are stacked together in engagement with each other on a common axis.

Figure 5:
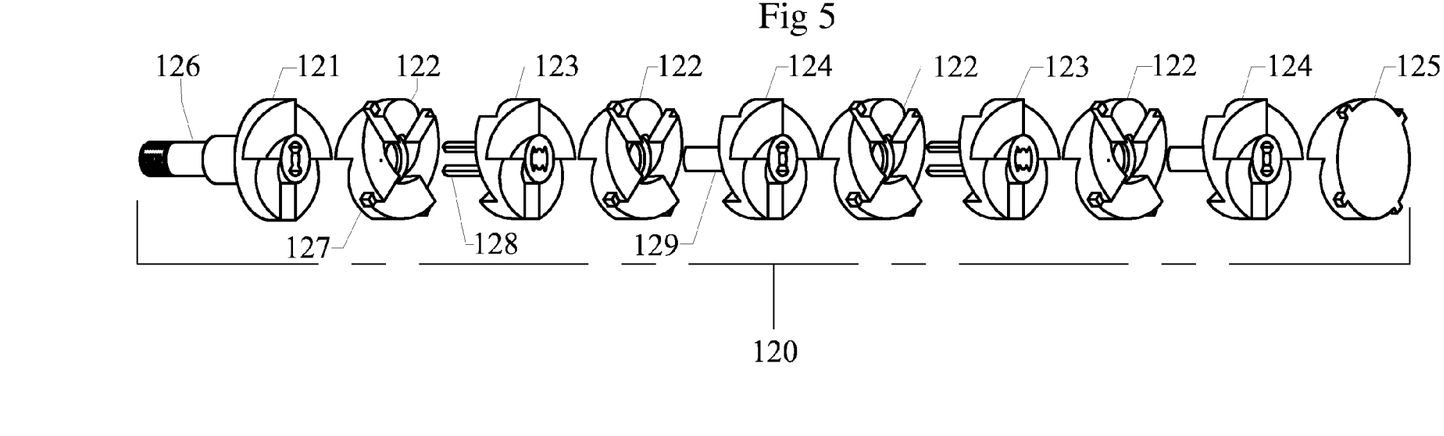
FIG. 5 is an exploded view of an assembly of driver and driven stepped discs forming part of a displacement mechanism according to the invention.

Torque to rotate the input driver disc 121 is provided by way of an integral threaded shaft 126 by means not shown in this drawing, such as a motor or a manual crank. In order for the mechanism to extend, the drive torque must be transmitted from input driver disc 121 to all of the driver discs 123 and 124. Also the driven discs 122 must be restrained against rotation. This restraint is achieved by means of four projecting lugs 127 on each driven disc which can locate in an external spline or similar channels, not shown in this drawing.

Figure 6:
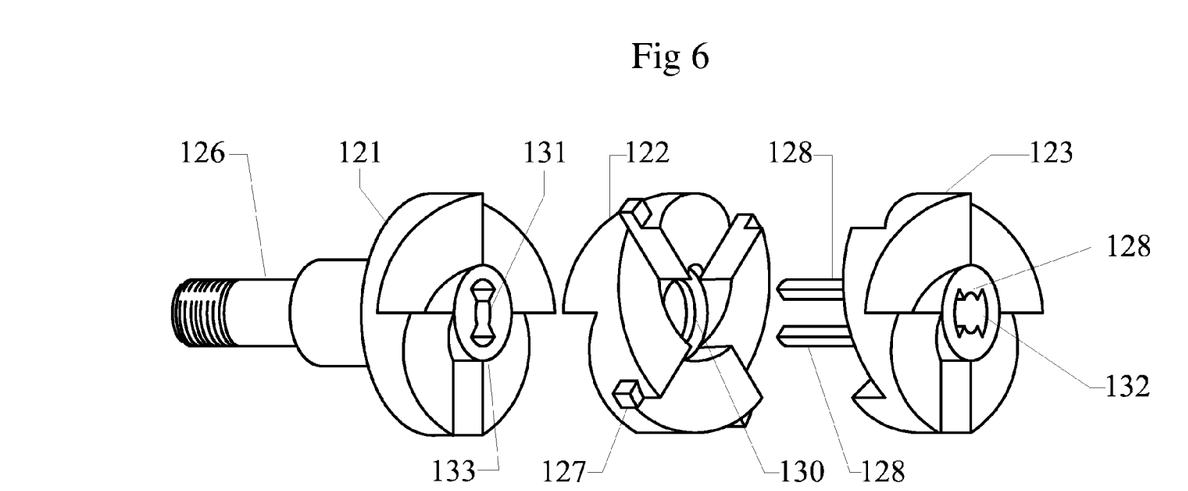
FIG. 6 is an enlarged exploded view of two driver and one driven disc at one end of the assembly of FIG. 5.

The communication of the drive torque cannot be by fixed linkage because the separation between the driver discs increases as the assembly extends and they move outwardly along the axis. Communication of the torque from driver disc to driver disc is thus effected by a system of projecting ribs 128, 129 which consist of internal raised portions, formed within keyhole bores 131 and 132 within central bosses 133 of the driver discs, and external prong-like portions. The external prongs pass through bores 130 in the driven discs and engage in the keyhole bores 131, 132 of adjacent driver discs. The prongs 128 and bores 132 on driver discs 123 are identical to the prongs 129 and keyhole bores 131 on driver discs 124, the only difference being their relative orientation of 90° to each other in the assembly stack.

Each projecting rib extends over 90° of arc so that its extending prong portions actually key into the spaces between the ribs in the central bore of the next driver disc. Thus the driver discs 123, 124 are keyed for rotation together and with the input driver disc 121 by means of the engagement of the pronged extensions of ribs 128, 129 with the internal portions of the ribs 128, 129 within keyhole bores 131, 132 of the next driver disc. At the same time, this arrangement of prongs and keyholes allows them to slide relative to each other in the axial direction, thereby enabling the assembly to extend.

Figures 7, 8, 16, 17:
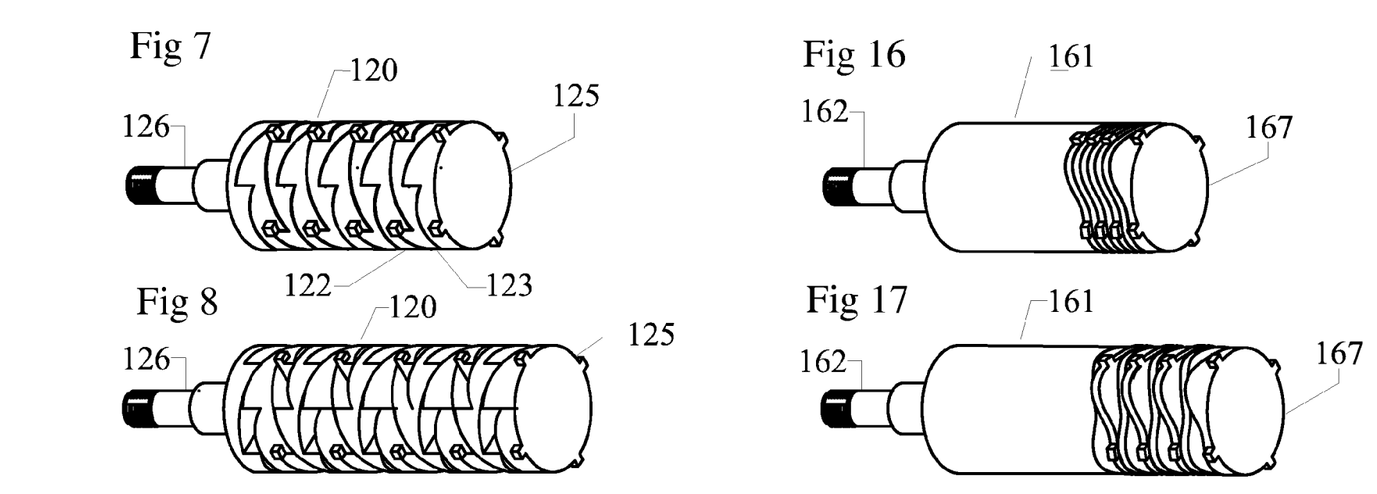
FIG. 7 is an isometric perspective view of the assembly of FIG. 5 in its unextended state.
FIG. 8 is an isometric perspective view of the assembly of FIG. 5 in a partially extended state.
FIG. 16 is an isometric perspective view of the assembly of FIG. 14 in its unextended state.
FIG. 17 is an isometric perspective view of the assembly of FIG. 14 in a partially extended state.
Figure 9:
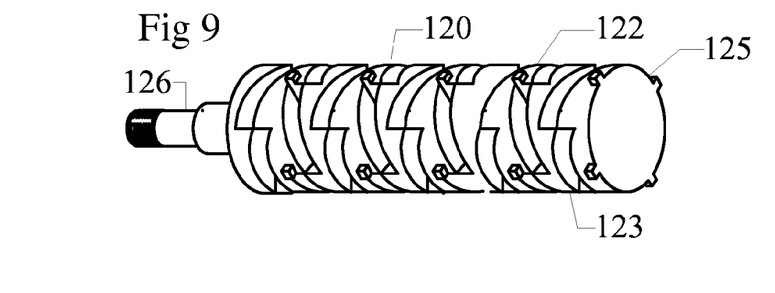
FIG. 9 is an isometric perspective view of the assembly of FIG. 5 in its fully extended state.

FIGS. 7, 8 and 9 show the assembly 120 in its unextended, partially extended and fully extended states, respectively, the fully extended state again being achieved after a rotation of 90°.

Figure 10:
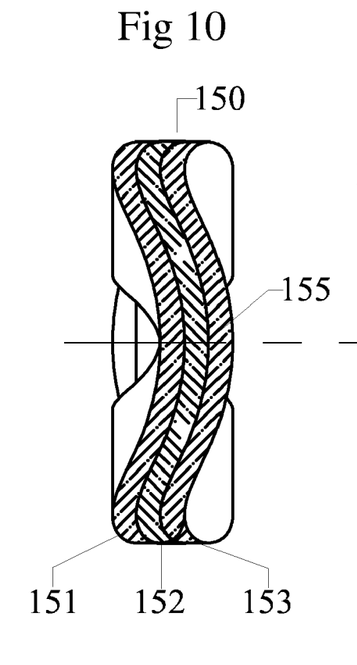
FIG. 10 is a side elevation of a portion of an unextended undulating disc stack illustrating the principles of an alternative displacement mechanism according to the invention.
Figure 11:
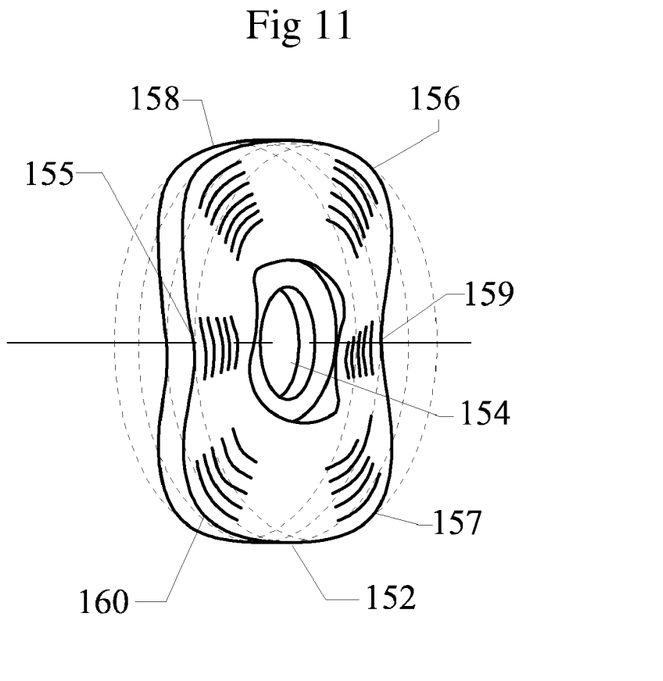
FIG. 11 is an isometric perspective view of one of the undulating discs making up the stack of FIG. 10.
Figures 12, 13:
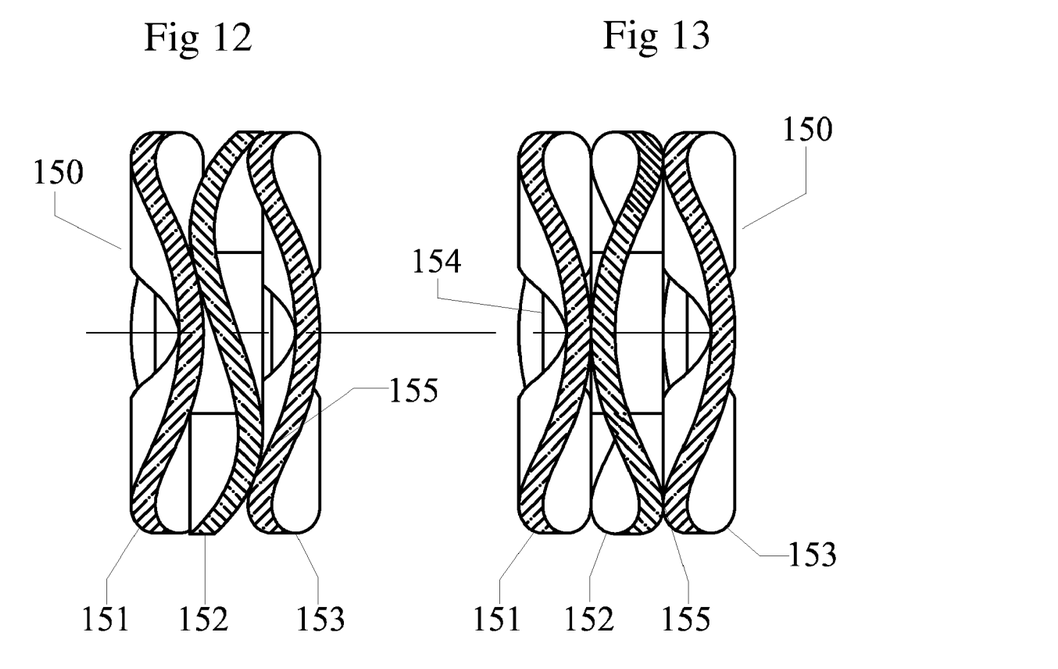
FIG. 12 is a side elevation of the stack of FIG. 10 in a partially extended state.
FIG. 13 is a side elevation of the stack of FIG. 10 in a fully extended state.

Another form of displacement mechanism according to the further aspect of the invention is illustrated in principle in FIGS. 10 to 13 and a practical implementation is shown in FIGS. 14 to 18. FIGS. 10, 12 and 13 show a stacked assembly 150 of three discoidal elements 151, 152 and 153. For clarity, the outer edges of the discs are shown cross hatched in FIGS. 10, 12 and 13. The operation of the mechanism is very similar to that of the mechanism of FIGS. 1 to 4, the principal difference lying in the relief of the faces of the discoidal elements.

By way of example, one of the elements 152 is shown in perspective in FIG. 11 in the initial orientation that it has in FIG. 10. It can be seen, by noting the intersection of the disc at various points with three dashed reference circles, that instead of a ramped surface, the disc has smooth out-of-plane undulations, surrounding a central bore, 154. Looking at the visible face of disc 152 from the right in FIG. 11, these undulations consist of three ridges, 155,156 and 157, interspersed with three valleys, 158, 159 and 160. On the reverse face, the ridges become valleys and vice versa. It should be noted that, although, in FIG. 11, the discs do not appear circular but waisted, this is an effect of the undulations on the perspective view and is caused by the fact that the ridges, such as 155, are raised with respect to the neighbouring valleys, 158 and 160. The vertical projection of a disc onto a plane is actually still a circle.

FIG. 10 shows the assembly in its unextended state with the discs 151-153 in a relative rotational orientation which takes up the minimum space. In this orientation, the discs interfit snugly with their undulating surfaces in full contact so that the ridges and valleys of each disc surface nestle in the valleys and ridges respectively of an adjacent disc surface. In this example, it is assumed that all the discs or at least discs 151 and 153 can move axially. It is further assumed that disc 152 can be rotated while discs 151 and 153 are restrained against rotation.

The effect of rotation of disc 152, as shown in FIG. 12 is to drive the discs 151 and 153 away from disc 152 by camming action, as the rising slopes of the opposed surfaces bear on each other. Note the new position of ridge 155 of driver disc 152, corresponding to a rotation of 30°. Ultimately, after a total rotation of 60°, as shown in FIG. 15, the assembly is fully extended with the ridges of the undulating disc surfaces aligned.

Figure 14:
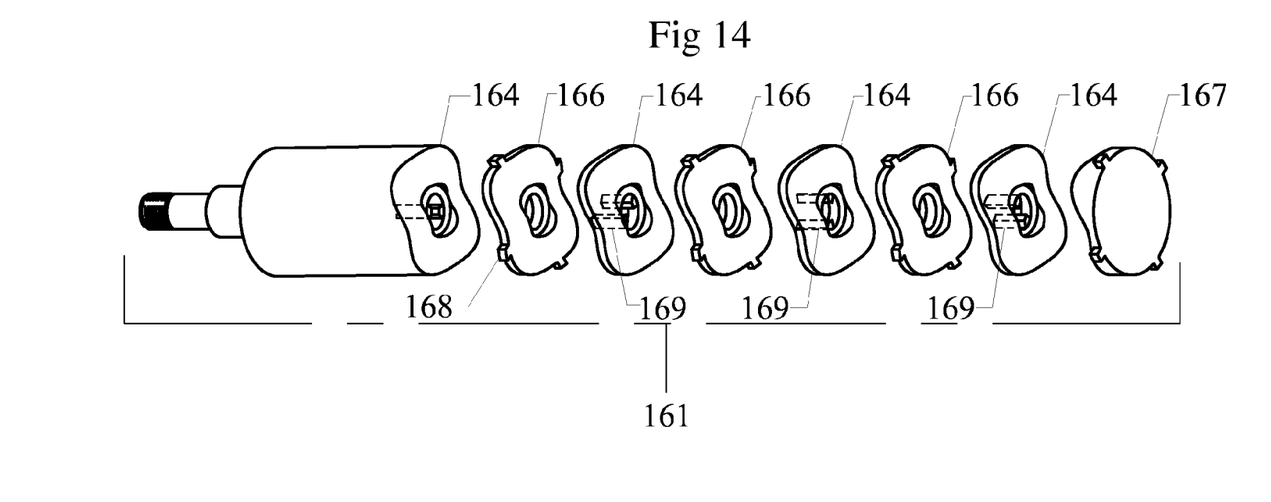
FIG. 14 is an exploded view of an assembly of driver and driven undulating discs forming part of a displacement mechanism according to the invention.
Figure 15:
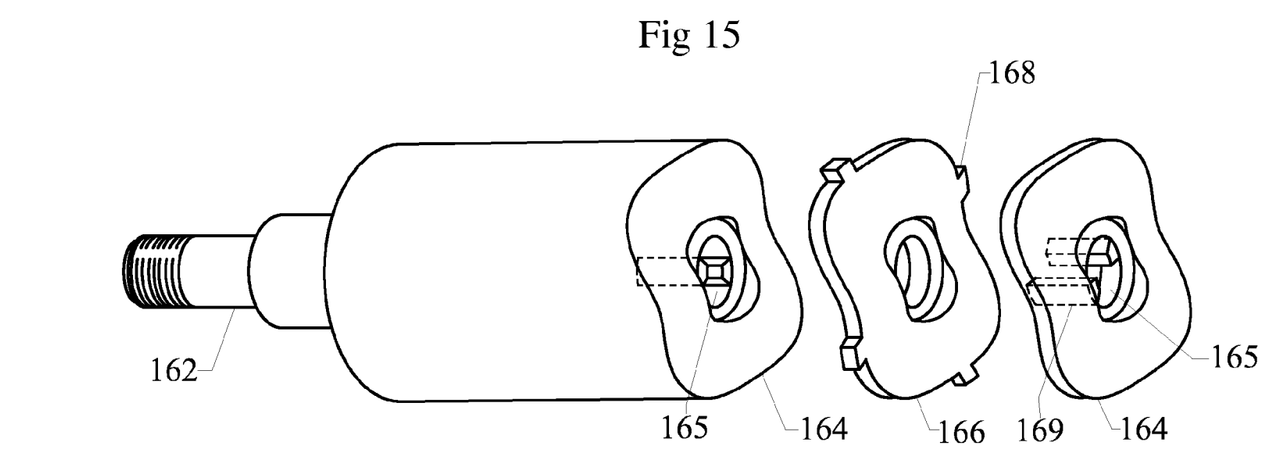
FIG. 15 is an enlarged exploded view of driver and driven discs at one end of the assembly of FIG. 14.

A practical assembly 161, operating according to the principles of FIGS. 10 to 13 is shown in exploded perspective view in FIG. 14 and a portion of the assembly is shown enlarged in FIG. 15. Similarly to the stepped disc version, the undulating disc stack is made up of a unique input driver portion, connected directly to threaded input drive shaft 162. The input driver portion is relieved on its inner face similarly to driver discs, 164

The driver discs 164 are all identical but have successively different orientations in the stack. Each drive has a central bore 165. Identical driven discs 166 are located between each pair of driver discs. The stack terminates in a driven output disc 167, seen on the right in FIG. 14. This has a relieved inner face but a blank outer face for transmitting linear output force.

Drive is communicated from the input drive shaft 162, via its driver portion to the driver discs 164 which are able to separate axially, by means of a system of prongs and keyholes similar to that of FIGS. 5 and 6. However, because of the lack of depth of those discs, it is necessary to have 4 pairs of shorter prongs 169 instead of the two shown on the stepped type.

These are shown schematically in dashed outline in FIGS. 14 and 15. As can be seen from the orientation of the prongs in the drawing, successive driver discs are rotated by 90° with respect to the next driver disc. The prongs pass through central bores in the driven discs and key into correspondingly shaped recesses in the bores 165 of other driver discs and of the input driver portion on shaft 162. Because the discs are so thin, the prongs actually pass through and key into more than a single neighbouring driver disc in the stack.

The driven discs 166 are each restrained against rotation by a system of four lugs 168, located 90° apart on the circumference of the driven discs. These engage in splined external channels, not shown in this drawing. As the driver discs are rotated, the assembly expands owing to the camming action between driver and driven discs.

Figure 18:
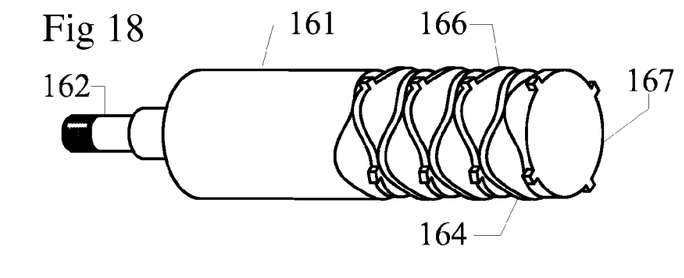
FIG. 18 is an isometric perspective view of the assembly of FIG. 14 in its fully extended state.

The assembly 161 is shown in FIGS. 16, 17 and 18 in its unextended, partially extended and fully extended states, respectively. In comparison with the stepped disc assembly 120 of FIGS. 7 to 9, the extension is the same for the same amount of relief but it will be noted that the discs of assembly 161 can be packed much more closely in their unextended state. Thus a much more compact actuator can be produced using the undulating discs or else a much greater extension can be used by packing more discs into the same initial length assembly. These illustrations show how fewer undulating discs achieve the same offset as the stepped version and could possibly achieve an offset of 200% of their initial unextended length.

Figure 19:
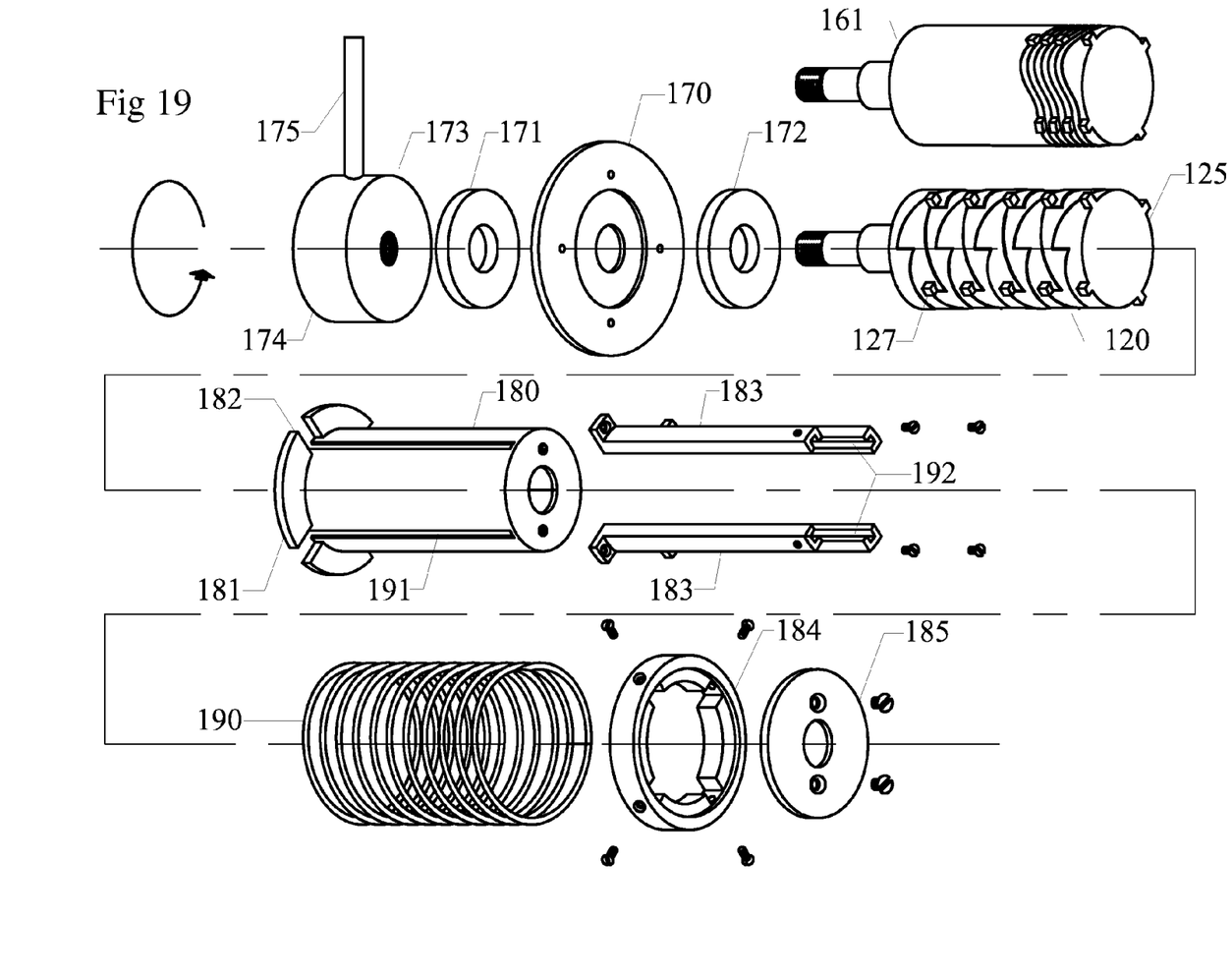
FIG. 19 is an exploded perspective view of an actuator and displacement mechanism according to the invention including either the stepped disc assembly of FIGS. 5 to 9 or the undulating disc assembly of FIGS. 14 to 18.

Turning now to FIGS. 19 to 22, the incorporation of the assemblies 120 or 161 into a complete rotary to linear displacement mechanism in an actuator will be described. FIG. 19 is an exploded view of the actuator, which has a common structure capable of accommodating either the stepped disc assembly 120 or the undulating disc assembly 161, both of which are shown in their unextended state. In fully assembled form in FIGS. 20 to 22, only the stepped disc version is shown but it will be understood that it is interchangeable with the undulating disc version. However, the following description will refer only to the stepped disc version, for brevity.

An annular base plate 170 supports the moveable portions of the actuator by means of two bearing races 171 and 172 in which the drive shaft 126 is mounted for rotation. A drive mechanism 173 comprises a hub 174, threaded onto shaft 126 which hub is itself rotated by a crank 175. The drive mechanism 173 could equally well be an electric motor such as a stepper motor or servo motor.

The assembly 120 is housed in a cylindrical piston-like cover 180 which is of the same length as the unextended assembly 120. At its open end, the cover 180 terminates in a flange 181, provided with four slots 182. These slots locate slideably on the exterior of four guide legs 183, secured to the base plate 170 at one end and bolted to a collar 184 at the other end to form a cage for the piston cover 180. The cover 180 is free to move axially and to protrude through the collar 184 when driven by the expanded disc assembly. The other end of the piston cover is bolted to an end plate 185, for delivering the output of the actuator. To restore the actuator to its original state, that is, with the assembly contracted, a return spring 190 is located between the piston cover flange 181 and the collar 184 to provide a resilient bias against expansion. The return spring is a compression spring and bears on the flange 181 and the collar 184.

In order to prevent the driven discs of the disc assembly from rotating, the lugs 127 of the driven discs in assembly 120 locate in narrow channels 191 running along the piston cover 180 in an axial direction. Since, however, in its expanded state the disc assembly is much longer than the cover 180, the guide legs 183 are also provided with further internal grooves 192, aligned with grooves 191 on the piston cover. These grooves 191 and 192 ensure that the lugs 127 of driven discs 122 are always engaged to prevent rotation.

Figure 20:
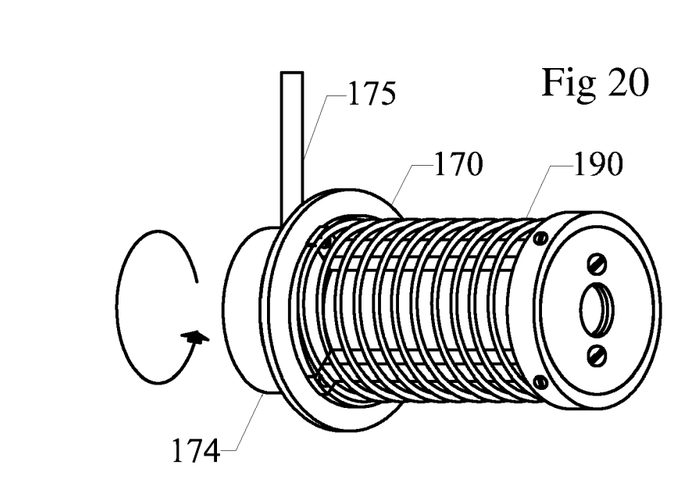
FIG. 20 shows the actuator and displacement mechanism of FIG. 19 in its unextended state.
Figure 21:
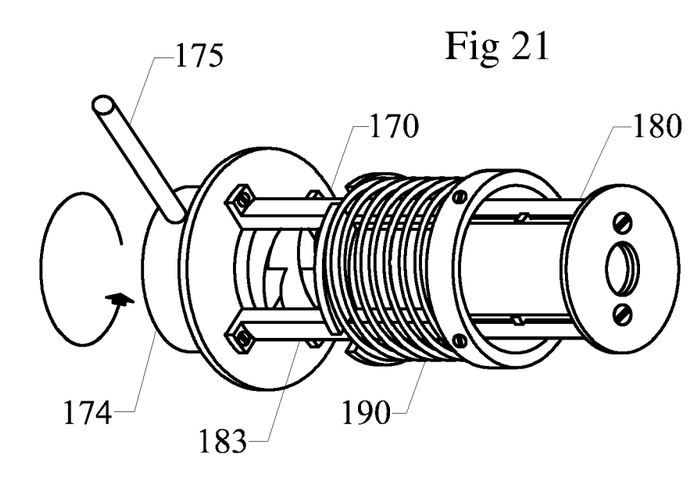
FIG. 21 shows the actuator and displacement mechanism of FIG. 19 in a partially extended state.
Figure 22:
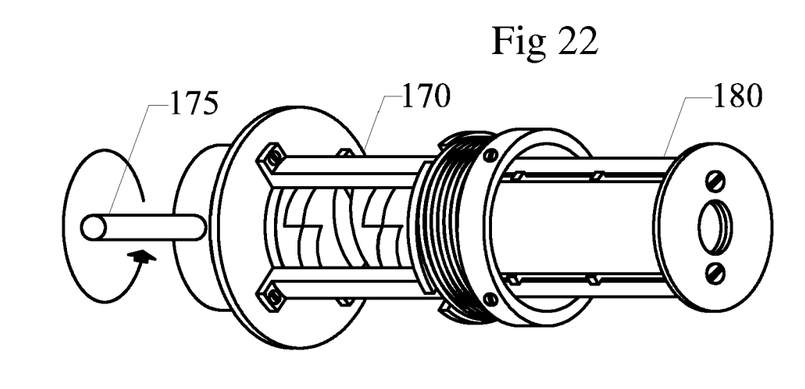
FIG. 22 shows the actuator and displacement mechanism of FIG. 19 in its fully extended state.

The operation of the actuator can be better understood by looking at FIGS. 20 to 22. In FIG. 20, the actuator is in its unextended state. Operation of the crank 175 in the direction of the arrow rotates the hub 174 and drive shaft 126 to cause expansion of the disc assembly 120. This forces the piston cover 180 outwardly against the action of the return spring 190, guided by guide legs 183, as shown in FIG. 21. In FIG. 22, the piston 180 is fully extended.

If the described actuator is to be used in applications requiring a single stroke, such as precision positioning or dispensing of a measured volume of fluid, then it is desirable to limit the travel to prevent the discs overshooting their maximum displacement.

The displacement of the actuator of FIGS. 19 to 22 is limited by the action of the cover flange 181 fully compressing the spring 190 against the collar 184 as shown in FIG. 22. This stops rotation of the stepped discs beyond their maximum displacement, which would result in an abrupt return as return steps 106 of adjacent discs slipped over each other. If the piston cover were slightly longer, it would be possible to drive the mechanism with a continuously rotating input and produce a reciprocating motion. Clearly, this would be smoother if the undulating disc assembly were used, as this has equally smooth stroke and return slopes but the return stroke is faster with the stepped version.

In comparing the two types of disc, the major advantage of the undulating version is that it is particularly compact when unextended and therefore is more suitable for applications having a limited space.

Figure 23:
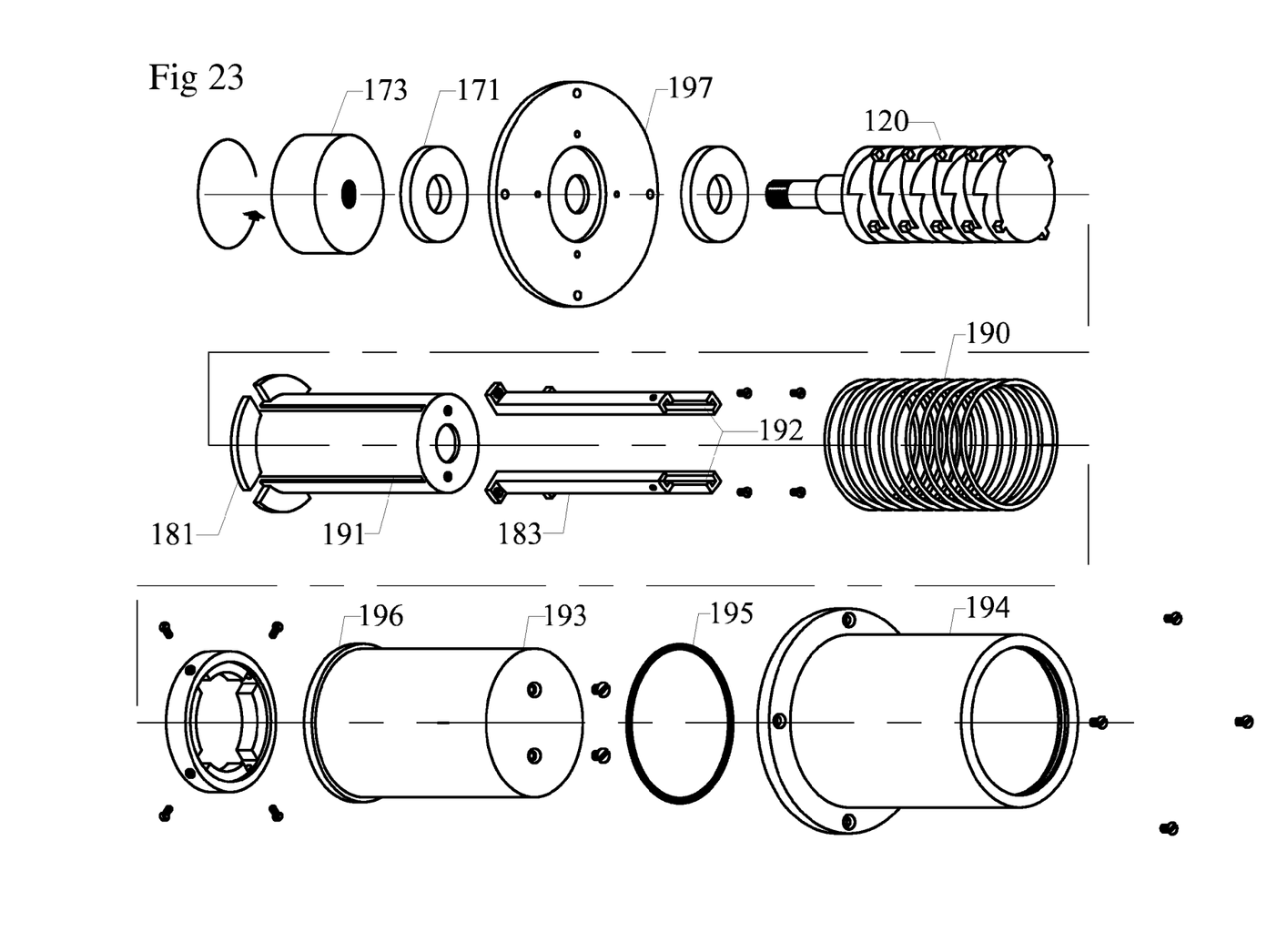
FIG. 23 is an exploded perspective view of a modification for a pump application of the actuator and displacement mechanism illustrated in FIG. 19.

A variant of the assembly of FIGS. 19 to 22 which is more suitable for a pump application is shown in FIG. 23. This is largely identical to FIG. 19, identical parts being identically numbered, but includes a larger base plate 197, a secondary piston cover 193, in place of end cap 185 and an outer casing 194 in which sits an O-ring 195. The secondary piston cover 193 slides up past the O-ring, secured in the recess at the end of the outer casing 194 and is restrained from over extension by a flange 196 at the foot of the outer piston cover. The secondary piston cover is thus able to pump fluid without leakage from the cylinder formed by the outer casing.

Figure 24:
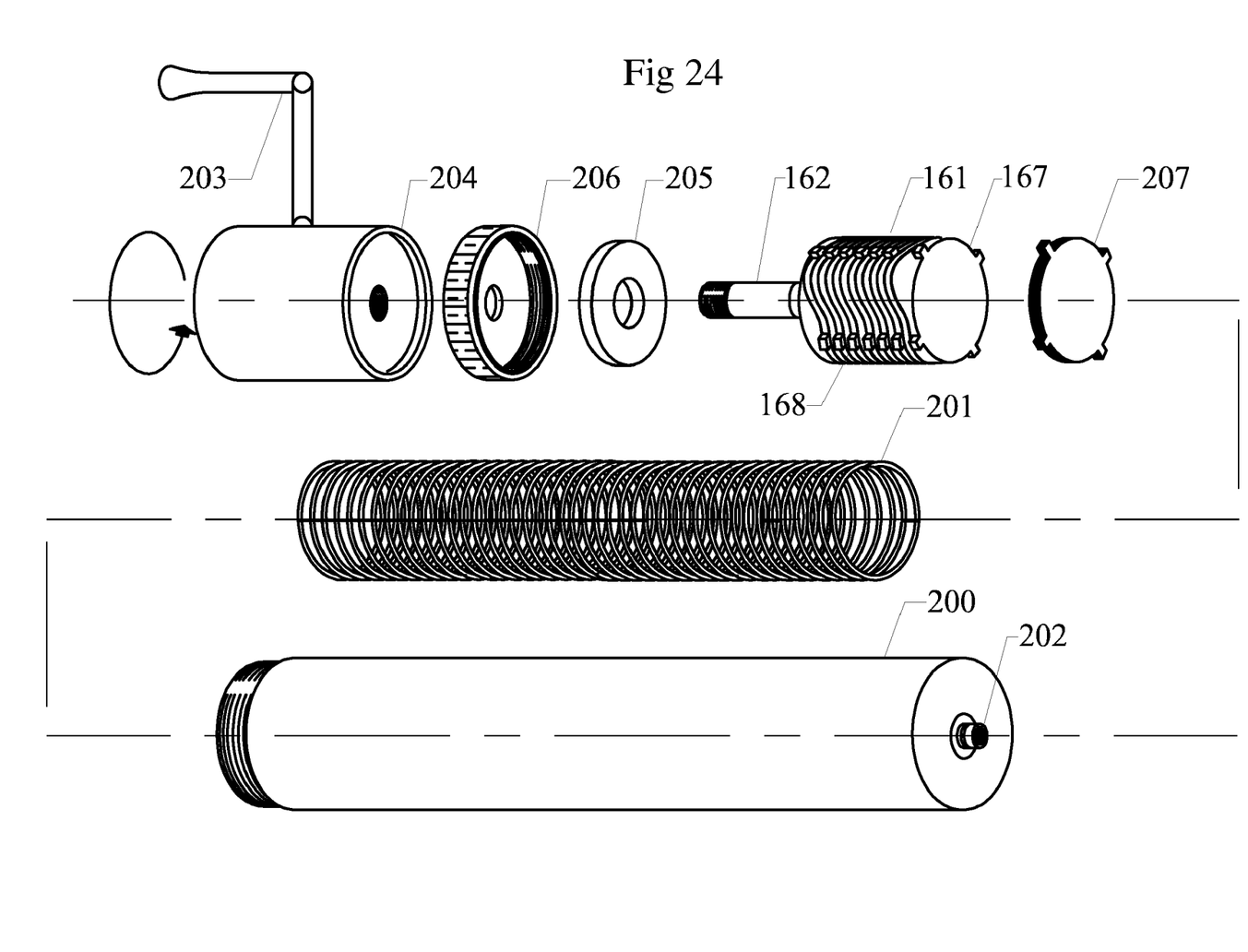
FIG. 24 is an exploded view of a pump employing the assembly of FIGS. 14 to 18.

FIG. 24 illustrates the application of the undulating disc assembly as described in FIGS. 14 to 18 to a pump. The assembly 161 is mounted in a pump barrel 200 and driven against a compression spring 201 at the end of the barrel having an outlet valve 202. The inside of the barrel is splined or grooved to constrain the driven discs of the assembly to linear movement only, by engagement of lugs 168 with the grooves.

The assembly is driven, in a similar manner to FIG. 19 by means of a crank handle 203 and hub 204. The hub 204 and the input drive shaft 162 are mounted in bearings 205 located in a threaded end cap 206 at the opposite end of the barrel to the outlet valve. Because the barrel is long enough to permit the discs of assembly 161 to rotate continuously, the assembly expands and contracts in reciprocating fashion to produce the pumping action. A disc 207 acts as a one way seal to permit air or other pumped fluid to be drawn into the outlet end of the pump barrel.

Although the stepped disc mechanism could also be used, the undulating version offers a smoother reciprocating action, albeit with a slower return action.

Figure 25:
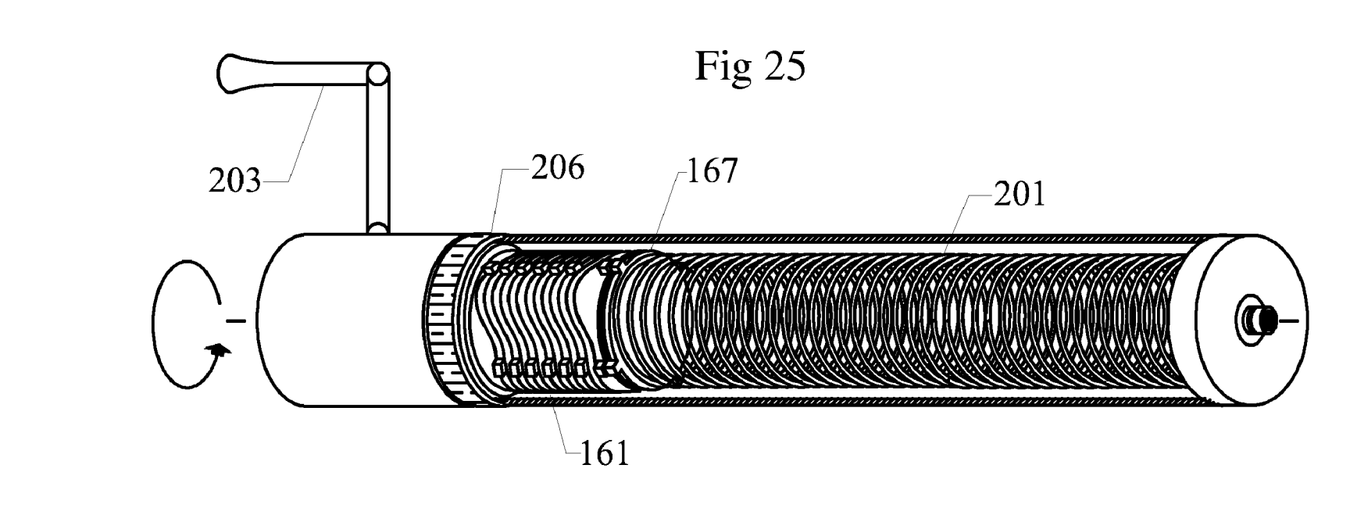
FIG. 25 shows the assembled pump of FIG. 24 on its inlet stroke.
Figure 26:
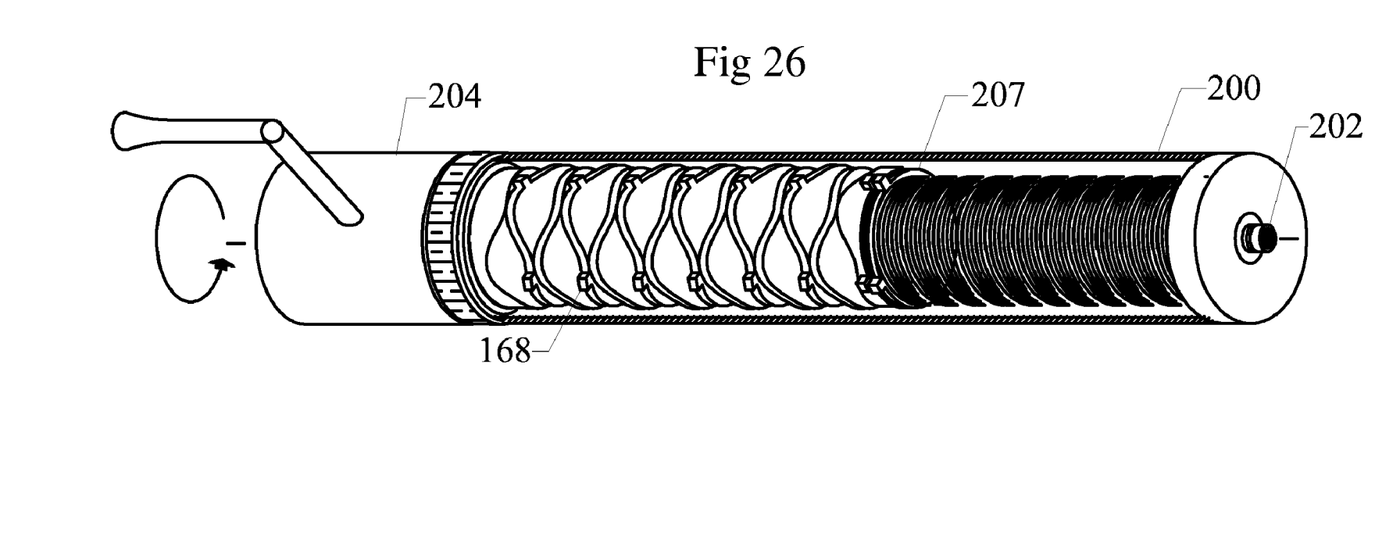
FIG. 26 shows the assembled pump of FIG. 24 on its outlet stroke.

FIG. 25 shows the assembled pump at one extreme of its inlet stroke, with the assembly 161 fully contracted. FIG. 26 shows the assembled pump at the extreme of its outlet stroke, with the assembly 161 fully extended.

The invention claimed is:

1. A rotational to linear displacement conversion mechanism comprising:
   an assembly including a plurality of driver discoidal elements (101,123, 164) and a plurality of driven discoidal elements (102, 122,166) mounted alternately on a common central axis to form an interleaved stack, each discoidal element having a ramped surface (105-108, 155-157), the ramped surfaces of adjacent elements being complementarily shaped and opposed so that, when in contact and completely interengaged, the discoidal elements form a stack of minimum length;
   coupling means (128, 129, 131, 132) for coupling the driver discoidal elements for rotation together about the axis by an externally applied force while permitting them to translate along the axis;
   a driven element mounting means wherein said driven elements are mounted in such a way as to permit translation of the driven elements along the common axis while preventing rotation of the driven elements about the common axis, whereby a rotational displacement of the driver elements by the externally applied force causes the elements to separate by camming action of the interengaged ramp surfaces so as to produce an extension of the stack corresponding to the cumulative separations of the driver and driven elements; and
   resilient bias means (190) for restoring the assembly to its minimum length in the absence of the externally applied force.

2. The mechanism as claimed in claim 1 in which at least the driven discoidal elements intermediate the ends of the stack are provided with axially aligned bores (130), each driver element having a projection, extending axially from one face, which extends through the bore of a driven disc adjacent to the projection and locates in a recess in a recess in a proximate driver element in keyed, slideable engagement therewith so that rotational drive force can be transmitted between driver elements while allowing relative sliding motion in an axial direction.

3. The mechanism as claimed in claim 2, in which each said driver element recess is part of a bore (131, 132) through the driver element and said projection (128, 129) is part of at least one rib formed on an inner surface of the bore of said projection's corresponding driver element, wherein the at least one rib projects outwardly from said at least one rib's driver element and engages at least one complementarily oriented rib portion in the bore of the proximate driver element to provide said keyed slideable engagement.

4. The mechanism as claimed in claim 3, in which the bore (131,132) in each intermediate driver element is provided with two diametrically opposite ribs each extending over a 90 degree arc of the bore, said ribs being keyed into engagement with a similar pair of ribs in the proximate driver element oriented at 90 degrees to the first mentioned pair of ribs.

5. The mechanism as claimed in claim 1, in which the driven elements each have a plurality of peripheral lugs (127; 168), the driven element mounting means including a grooved guide means (180,191, 183, 192) surrounding the stack in which the lugs locate to prevent rotation.

6. The mechanism as claimed in claim 1, in which an initial driver element (121) is located at one end of the stack and has an out portion, adapted to be coupled to an external drive, and an inner ramped surface and in which a terminal driven element (125) is located at the opposite end of the stack and has an outer surface, adapted to deliver a translational load force, and an inner ramped surface, intermediate driver and driven elements having ramped surfaces on both sides.

7. The mechanism as claimed in claim 6, in which the driven elements each have a plurality of peripheral lugs (127; 168), the driven element mounting means including a grooved guide means (180,191, 183, 192) surrounding the stack in which the lugs locate to prevent rotation and which includes a housing assembly for the stack, said housing assembly forming said driven element mounting means and comprising a cylindrical cover (180) for the stack to one end of which the terminal driven element is fixed, the other end of the cover terminating in a slotted flange (181), the housing assembly further comprising a fixed cage structure surrounding the cylindrical cover and being formed with a plurality of guide legs (183) extending in the axial direction and passing through the slots (182) in the flange of the cylindrical cover to constrain the cylindrical cover to linear movement, the cylindrical cover being provided with external grooves (191) and the guide legs being provided with internal grooves (192), in both of which said peripheral lugs locate in operation to restrain the driven discs against rotation while permitting translation.

8. The mechanism as claimed in claim 7 in which the resilient bias means is a coil spring (190) trapped between the flange (181) of the cylindrical cover and an end (184) of the cage.

9. The mechanism as claimed in claim 6, in which said initial driver element (121) is fixedly mounted on an outwardly extending axial shaft (126), threaded externally for coupling to the external drive.

10. The mechanism as claimed in claim 1, in which the driver and driven elements each have a plurality of ramps (105-108) per ramped surface, distributed circumferentially at evenly spaced positions.

11. The mechanism as claimed in claim 10, in which the camming ramp surfaces (105-108) are planar rising at a relatively shallow angle to the plane of the discoidal elements and alternating with relatively steep return surfaces (109-111).

12. The mechanism as claimed in claim 10, in which both rising and falling surfaces of the ramps are at a same angle.

13. The mechanism as claimed in claim 10, in which the ramped surfaces are smoothly undulating in form without discontinuity at peaks (155-157).

14. The mechanism as claimed claim 1, including a stop for preventing rotation of the driver elements beyond an arc defined by the ramp surfaces.

15. An actuator comprising:
   a rotational to linear displacement conversion mechanism comprising:
      an assembly including a plurality of driver discoidal elements (101,123, 164) and a plurality of driven discoidal elements (102, 122,166) mounted alternately on a common central axis to form an interleaved stack, each discoidal element having a ramped surface (105-108, 155-157), the ramped surfaces of adjacent elements being complementarily shaped and opposed so that, when in contact and completely interengaged, the discoidal elements form a stack of minimum length;
      coupling means (128, 129, 131, 132) for coupling the driver discoidal elements for rotation together about the axis by an externally applied force while permitting them to translate along the axis;
      a driven element mounting means wherein said driven elements are mounted in such a way as to permit translation of the driven elements along the common axis while preventing rotation of the driven elements about the common axis, whereby a rotational displacement of the driver elements by the externally applied force causes the elements to separate by camming action of the interengaged ramp surfaces so as to produce an extension of the stack corresponding to the cumulative separations of the driver and driven elements; and resilient bias means (190) for restoring the assembly to its minimum length in the absence of the externally applied force; and a drive mechanism (173) for rotatably driving the driver elements.

16. The actuator as claimed in claim 15 in which the drive mechanism is a motor.

17. The actuator as claimed in claim 15 in which the drive mechanism is a manually operated crank (175).

18. The actuator as claimed in claim 15 in which the displacement conversion mechanism is adapted for continuous rotation of the driver element.

19. A pump including:

a rotational to linear displacement conversion mechanism comprising:

an assembly including a plurality of driver discoidal elements (101,123, 164) and a plurality of driven discoidal elements (102, 122,166) mounted alternately on a common central axis to form an interleaved stack, each discoidal element having a ramped surface (105-108, 155-157), the ramped surfaces of adjacent elements being complementarily shaped and opposed so that, when in contact and completely interengaged, the discoidal elements form a stack of minimum length;

coupling means (128, 129, 131, 132) for coupling the driver discoidal elements for rotation together about the axis by an externally applied force while permitting them to translate along the axis;

a driven element mounting means wherein said driven elements are mounted in such a way as to permit translation of the driven elements along the common axis while preventing rotation of the driven elements about the common axis, whereby a rotational displacement of the driver elements by the externally applied force causes the elements to separate by camming action of the interengaged ramp surfaces so as to produce an extension of the stack corresponding to the cumulative separations of the driver and driven elements; and resilient bias means (190) for restoring the assembly to its minimum length in the absence of the externally applied force;

a rotatable crank (203) for rotatably driving the driver elements; and a sealed casing (200) for enclosing the mechanism and forming a pump chamber containing a one way inlet means (207) for permitting fluid to be drawn into the pump chamber as the mechanism contracts and an outlet (202) for enabling fluid to be expelled from the pump chamber as the mechanism extends one way, as the crank is rotated continuously.

20. A pump as claimed in claim 19 in which the driver and driven elements each have a plurality of ramps (105-108) per ramped surface, distributed circumferentially at evenly spaced positions.

* * * * *